(12) United States Patent
Zhao et al.

(10) Patent No.: US 11,595,666 B2
(45) Date of Patent: *Feb. 28, 2023

(54) INTERACTIONS BETWEEN DECODER-SIDE INTRA MODE DERIVATION AND ADAPTIVE INTRA PREDICTION MODES

(71) Applicant: TENCENT AMERICA LLC, Palo Alto, CA (US)

(72) Inventors: Liang Zhao, Sunnyvale, CA (US); Xin Zhao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,306

(22) Filed: Oct. 12, 2021

(65) Prior Publication Data

US 2022/0030252 A1 Jan. 27, 2022

Related U.S. Application Data

(63) Continuation of application No. 17/094,923, filed on Nov. 11, 2020, now Pat. No. 11,197,001.

(Continued)

(51) Int. Cl.
*H04N 19/00* (2014.01)
*H04N 19/159* (2014.01)
(Continued)

(52) U.S. Cl.
CPC ......... *H04N 19/159* (2014.11); *H04N 19/103* (2014.11); *H04N 19/176* (2014.11); *H04N 19/186* (2014.11); *H04N 19/46* (2014.11)

(58) Field of Classification Search
CPC ............... H04N 19/159; H04N 19/103; H04N 19/176; H04N 19/186; H04N 19/46
See application file for complete search history.

(56) References Cited

U.S. PATENT DOCUMENTS

| 10,469,845 B1 * | 11/2019 | Zhao .................... H04N 19/105 |
| 2011/0286520 A1 | 11/2011 | Xu et al. |
| 2012/0307894 A1 * | 12/2012 | Chien .................. H04N 19/176 375/E7.243 |
| 2015/0078447 A1 | 3/2015 | Gamei et al. |

(Continued)

FOREIGN PATENT DOCUMENTS

JP 2020-150344 A 9/2020

OTHER PUBLICATIONS

Extended European Search Report dated Jul. 15, 2022 in European Application No. 21750692.2.

(Continued)

*Primary Examiner* — Zhihan Zhou
(74) *Attorney, Agent, or Firm* — Sughrue Mion, PLLC

(57) ABSTRACT

A method of performing intra prediction of a current block of a picture of a video sequence, includes determining whether a first flag indicates that an intra prediction mode corresponding to the current block is a directional mode, and based on the first flag being determined to indicate that the intra prediction mode corresponding to the current block is the directional mode, determining an index of the intra prediction mode in an allowed intra prediction modes (AIPM) list, and performing the intra prediction of the current block, using the intra prediction mode corresponding to the determined index in the AIPM list.

20 Claims, 12 Drawing Sheets

Related U.S. Application Data

(60) Provisional application No. 62/970,505, filed on Feb. 5, 2020.

(51) Int. Cl.
  *H04N 19/176* (2014.01)
  *H04N 19/186* (2014.01)
  *H04N 19/103* (2014.01)
  *H04N 19/46* (2014.01)

(56) References Cited

U.S. PATENT DOCUMENTS

| | | | | |
|---|---|---|---|---|
| 2017/0374369 | A1* | 12/2017 | Chuang | H04N 19/593 |
| 2018/0176582 | A1* | 6/2018 | Zhao | H04N 19/136 |
| 2019/0166370 | A1* | 5/2019 | Xiu | H04N 19/176 |
| 2020/0036985 | A1 | 1/2020 | Jang et al. | |

OTHER PUBLICATIONS

Yue Chen et al., "An Overview of Core Coding Tools in the AV1 Video Codec", PCS 2018, pp. 41-45.

Peter de Rivaz et al., "AV1 Bitstream & Decoding Process Specification", Version 1.0.0 with Errata 1, pp. 1-681.

Jianle Chen, "Algorithm description for Versatile Video Coding and Test Model 7 (VTM 7)", Joint Video Experts Team (JVET) of ITU-T SG 16 WP 3 and ISO/IEC JTC 1/SC 29/WG 11, JVET-P2002-v1, Oct. 1-11, 2019, 16th Meeting, pp. 1-89, Geneva, CH.

Written Opinion of the International Searching Authority dated Apr. 16, 2021 in International Application No. PCT/US21/16343.

International Search Report dated Apr. 16, 2021 in International Application No. PCT/US21/16343.

Office Action dated Dec. 13, 2022 issued by the Japanese Patent Office in Japanese Application No. 2021-561659.

* cited by examiner

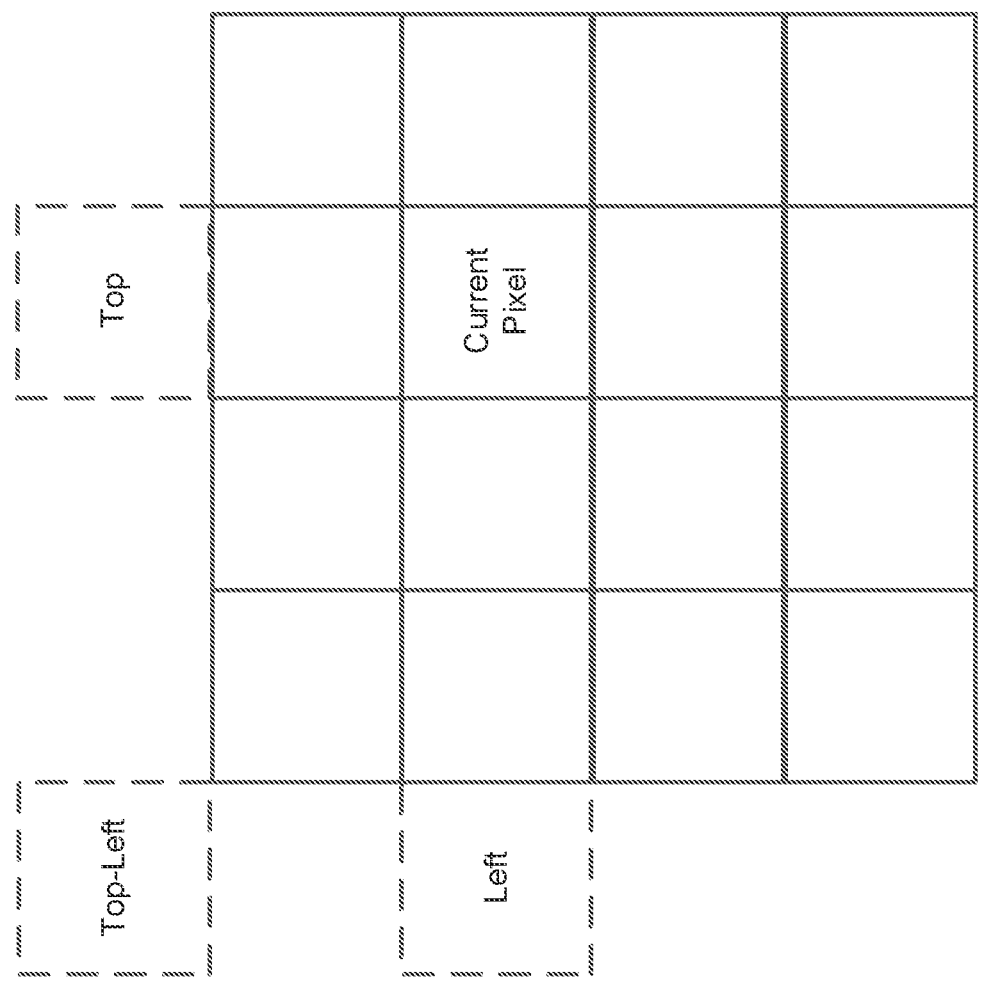

FIG. 6B

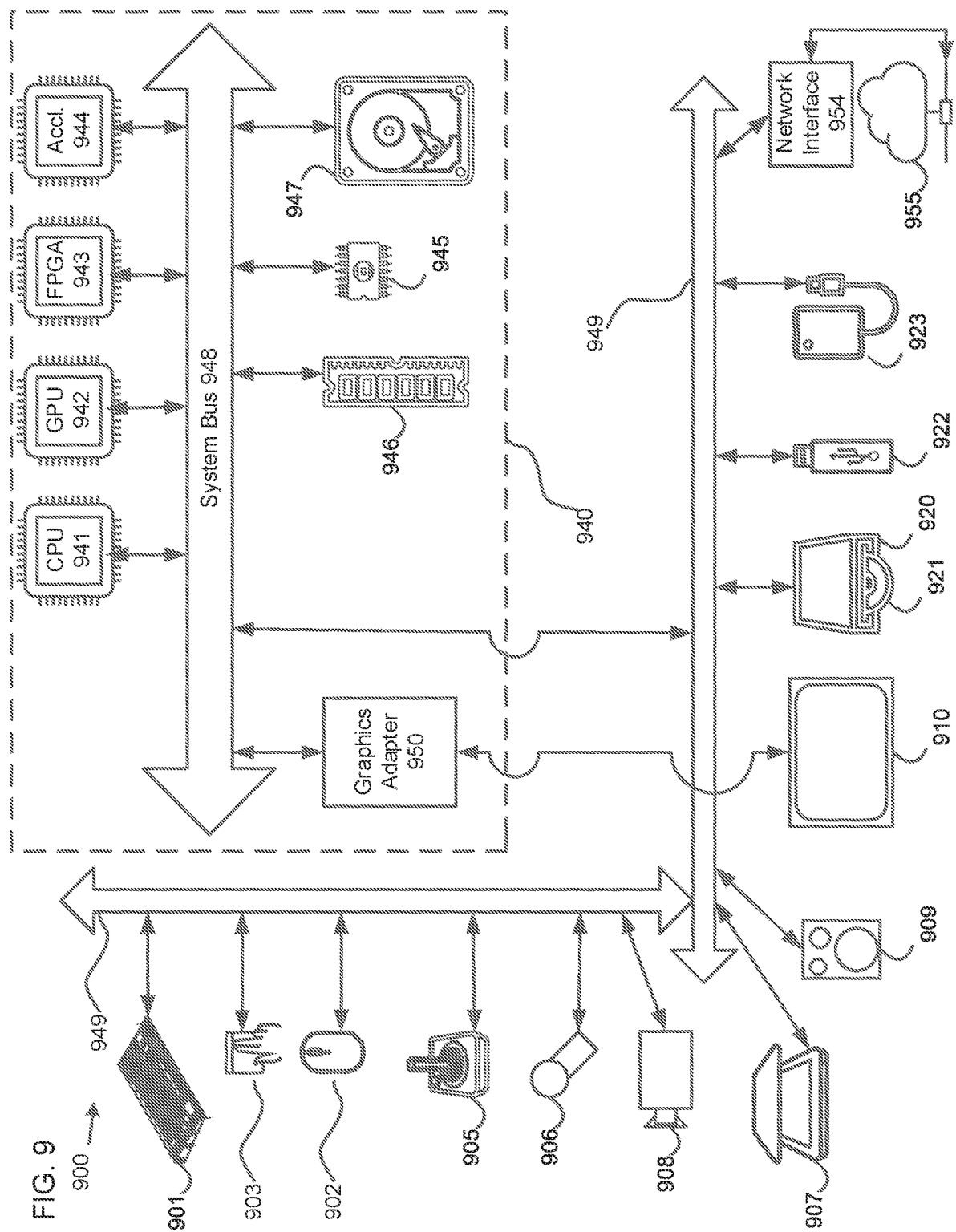

INTERACTIONS BETWEEN DECODER-SIDE INTRA MODE DERIVATION AND ADAPTIVE INTRA PREDICTION MODES

CROSS-REFERENCE TO RELATED APPLICATION

This application is a continuation application of U.S. application Ser. No. 17/094,923 filed Nov. 11, 2020, which claims priority from U.S. Provisional Patent Application No. 62/970,505, filed on Feb. 5, 2020, in the U.S. Patent and Trademark Office, which is incorporated herein by reference in its entirety.

FIELD

Methods and apparatuses consistent with embodiments relate to video coding, and more particularly, a method and an apparatus for interactions between decoder-side intra mode derivation and adaptive intra prediction modes.

BACKGROUND

The video coding format VP9 supports 8 directional modes corresponding to angles from 45 to 207 degrees. To exploit more varieties of spatial redundancy in directional textures, in the video coding format AOMedia Video 1 (AV1), directional intra modes are extended to an angle set with finer granularity. The original 8 angles are slightly changed and made as nominal angles, and these 8 nominal angles are named V_PRED, H_PRED, D45_PRED, D135_PRED, D113_PRED, D157_PRED, D203_PRED, and D67_PRED, as illustrated in FIG. 1. For each nominal angle, it has 7 finer angles, so AV1 has 56 directional angles in total. The prediction angle is presented by a nominal intra angle plus an angle delta, which is −3~3 multiples of the step size of 3 degrees. To implement directional prediction modes in AV1 via a generic way, all the 56 directional intra prediction modes in AV1 are implemented with a unified directional predictor that projects each pixel to a reference sub-pixel location and interpolates the reference pixel by a 2-tap bilinear filter.

SUMMARY

According to embodiments, a method of performing intra prediction of a current block of a picture of a video sequence, is performed by at least one processor, and includes determining whether a first flag indicates that an intra prediction mode corresponding to the current block is a directional mode, and based on the first flag being determined to indicate that the intra prediction mode corresponding to the current block is the directional mode, determining an index of the intra prediction mode in an allowed intra prediction modes (AIPM) list, and performing the intra prediction of the current block, using the intra prediction mode corresponding to the determined index in the AIPM list.

According to embodiments, an apparatus for performing intra prediction of a current block of a picture of a video sequence, includes at least one memory configured to store computer program code, and at least one processor configured to access the at least one memory and operate according to the computer program code. The computer program code includes first determining code configured to cause the at least one processor to determine whether a first flag indicates that an intra prediction mode corresponding to the current block is a directional mode, second determining code configured to cause the at least one processor to, based on the first flag being determined to indicate that the intra prediction mode corresponding to the current block is the directional mode, determine an index of the intra prediction mode in an allowed intra prediction modes (AIPM) list, and first performing code configured to cause the at least one processor to, based on the first flag being determined to indicate that the intra prediction mode corresponding to the current block is the directional mode, perform the intra prediction of the current block, using the intra prediction mode corresponding to the determined index in the AIPM list.

According to embodiments, a non-transitory computer-readable storage medium stores instructions that cause at least one processor to determine whether a first flag indicates that an intra prediction mode corresponding to a current block is a directional mode, and based on the first flag being determined to indicate that the intra prediction mode corresponding to the current block is the directional mode, determine an index of the intra prediction mode in an allowed intra prediction modes (AIPM) list, and perform intra prediction of the current block, using the intra prediction mode corresponding to the determined index in the AIPM list.

BRIEF DESCRIPTION OF THE DRAWINGS

FIG. 6A is a diagram of top, left, and top-left positions for a PAETH mode.

FIG. 6B is a diagram of recursive intra filtering modes.

FIG. 9 is a diagram of a computer system suitable for implementing embodiments.

DETAILED DESCRIPTION

Figure 1:
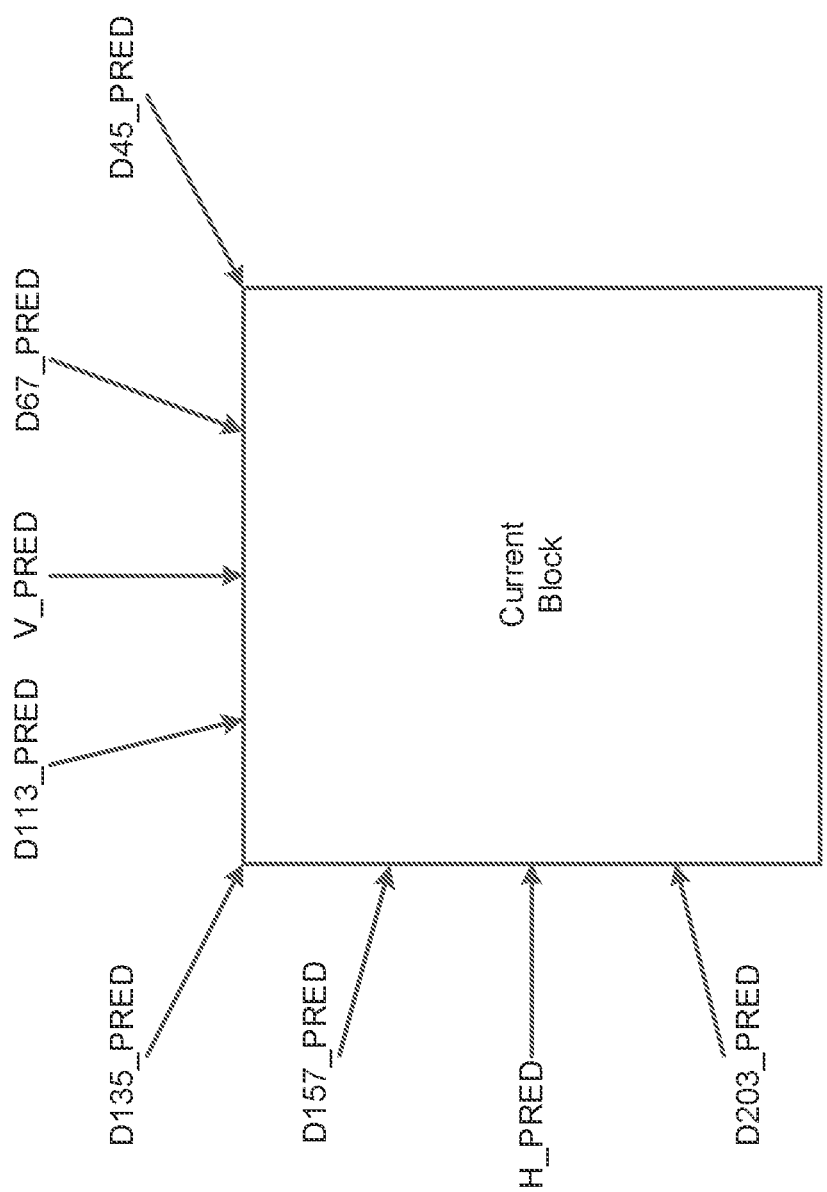
FIG. 1 is a diagram of eight nominal angles in AV1.
Figure 2:
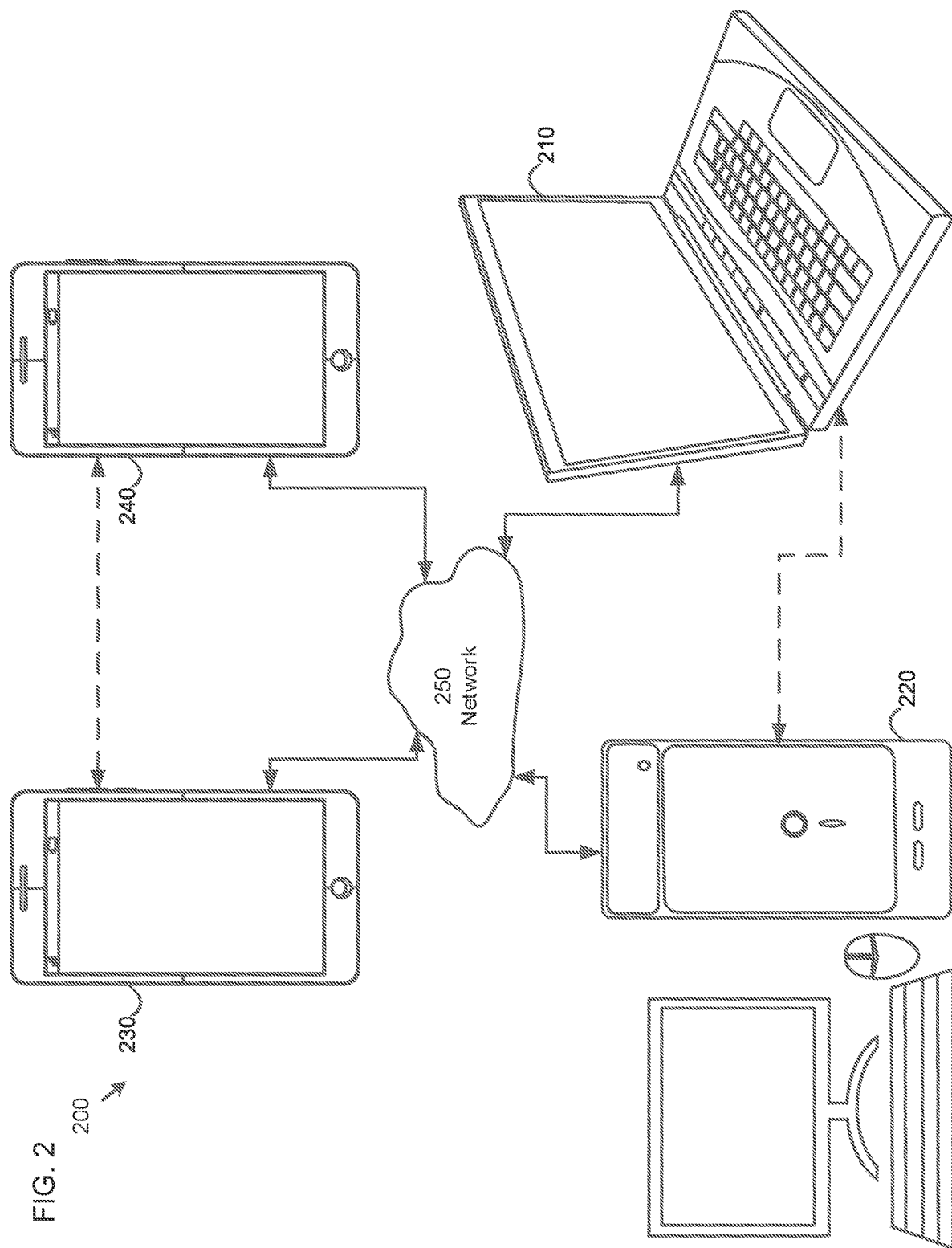
FIG. 2 is a simplified block diagram of a communication system according to embodiments.

FIG. 2 is a simplified block diagram of a communication system (200) according to embodiments. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
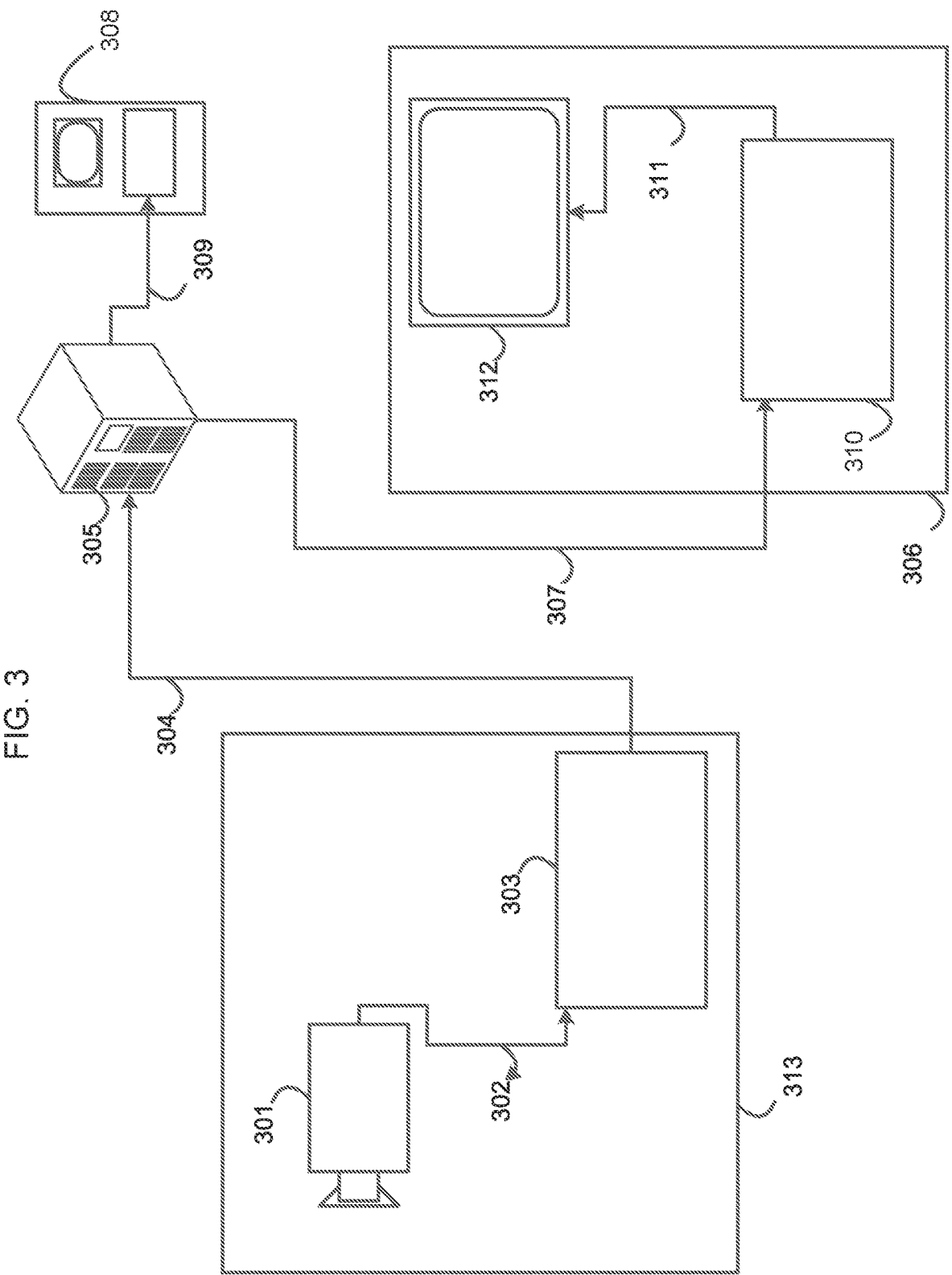
FIG. 3 is a diagram of a placement of a video encoder and a video decoder in a streaming environment, according to embodiments.

FIG. 3 is a diagram of a placement of a video encoder and a video decoder in a streaming environment, according to embodiments. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310), which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
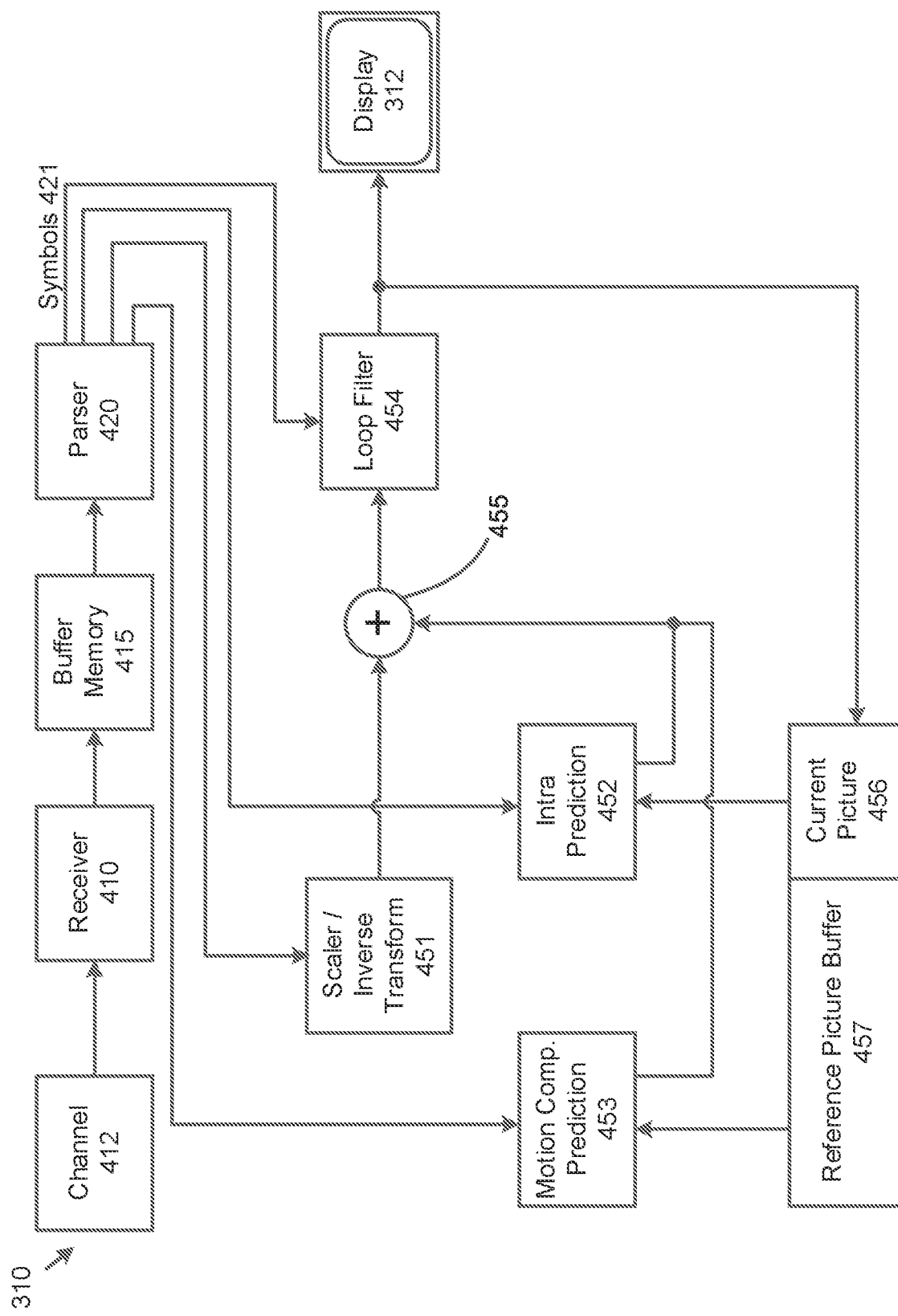
FIG. 4 is a functional block diagram of a video decoder according to embodiments.

FIG. 4 is a functional block diagram of a video decoder (310) according to embodiments.

A receiver (410) may receive one or more codec video sequences to be decoded by the decoder (310); in the same or embodiments, one coded video sequence at a time, where the decoding of each coded video sequence is independent from other coded video sequences. The coded video sequence may be received from a channel (412), which may be a hardware/software link to a storage device, which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks including sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In embodiments, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
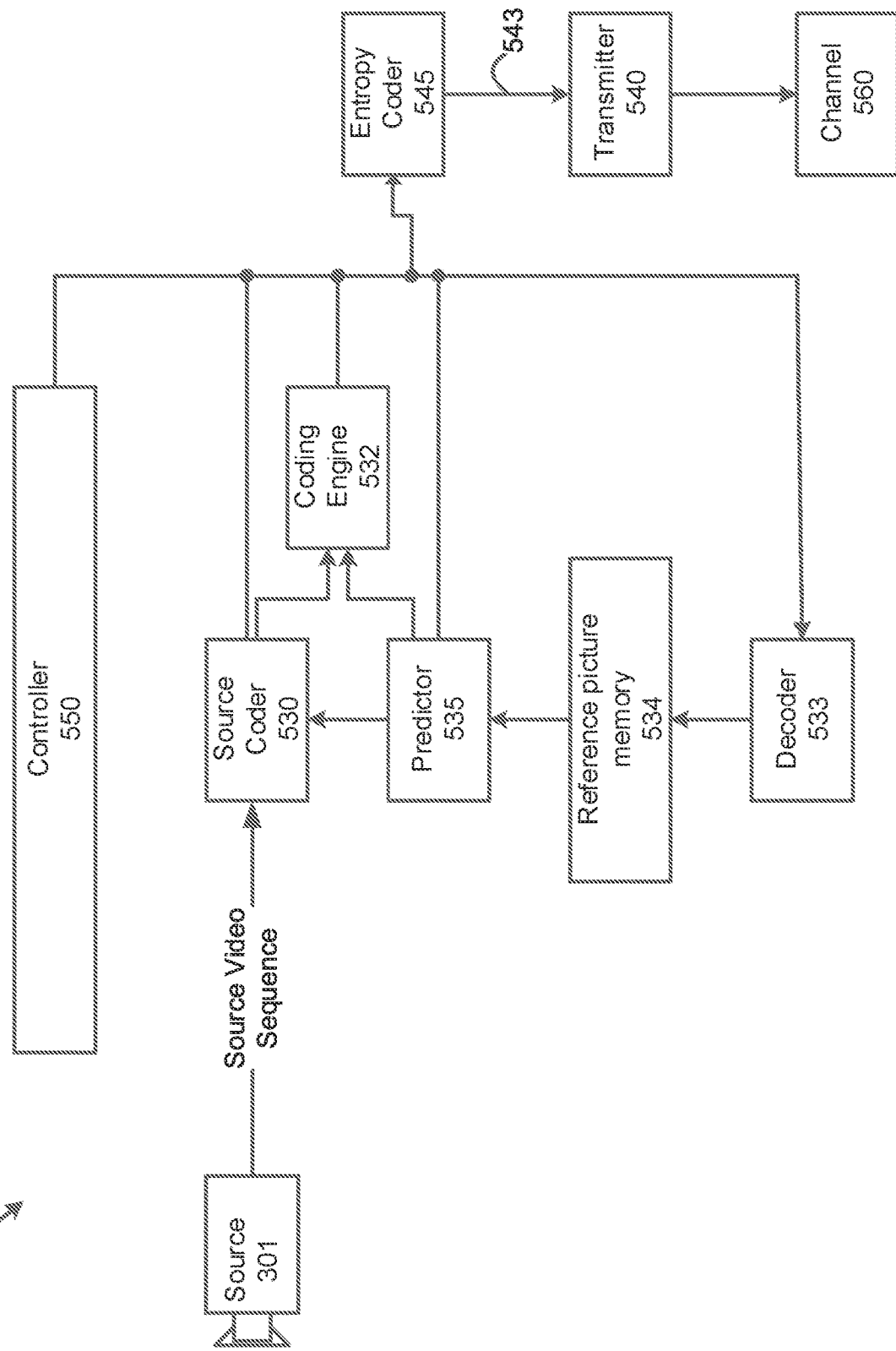
FIG. 5 is a functional block diagram of a video encoder according to embodiments.

FIG. 5 is a functional block diagram of a video encoder (303) according to embodiments.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any color space (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can include one or more samples depending on the sampling structure, color space, etc. in use. A person skilled in the art can readily understand the relationship between pixels and samples. The description below focuses on samples.

According to embodiments, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265 or Versatile Video Coding (VVC) H.266. In its operation, the video coder (303) may perform various compression operations, including predictive coding operations that exploit temporal and spatial redundancies in the input video sequence. The coded video data, therefore, may conform to a syntax specified by the video coding technology or standard being used.

In embodiments, the transmitter (540) may transmit additional data with the encoded video. The video coder (530) may include such data as part of the coded video sequence. Additional data may include temporal, spatial, and/or SNR enhancement layers, other forms of redundant data such as redundant pictures and slices, Supplementary Enhancement Information (SEI) messages, Visual Usability Information (VUI) parameter set fragments, and so on.

In AV1, there are 5 non-directional smooth intra prediction modes, which are DC, PAETH, SMOOTH, SMOOTH_V, and SMOOTH_H. For DC prediction, the average of left and above neighboring samples is used as the predictor of the block to be predicted. For a PAETH predictor, top, left and top-left reference samples are firstly fetched, and then the value that is closest to (top+left−topleft) is set as the predictor for the pixel to be predicted. FIG. 6A illustrates the positions of top, left, and top-left samples for one pixel in current block. For SMOOTH, SMOOTH_V, and SMOOTH_H modes, they predict the block using quadratic interpolation in vertical or horizontal directions, or the average of both directions.

Figure 6B:
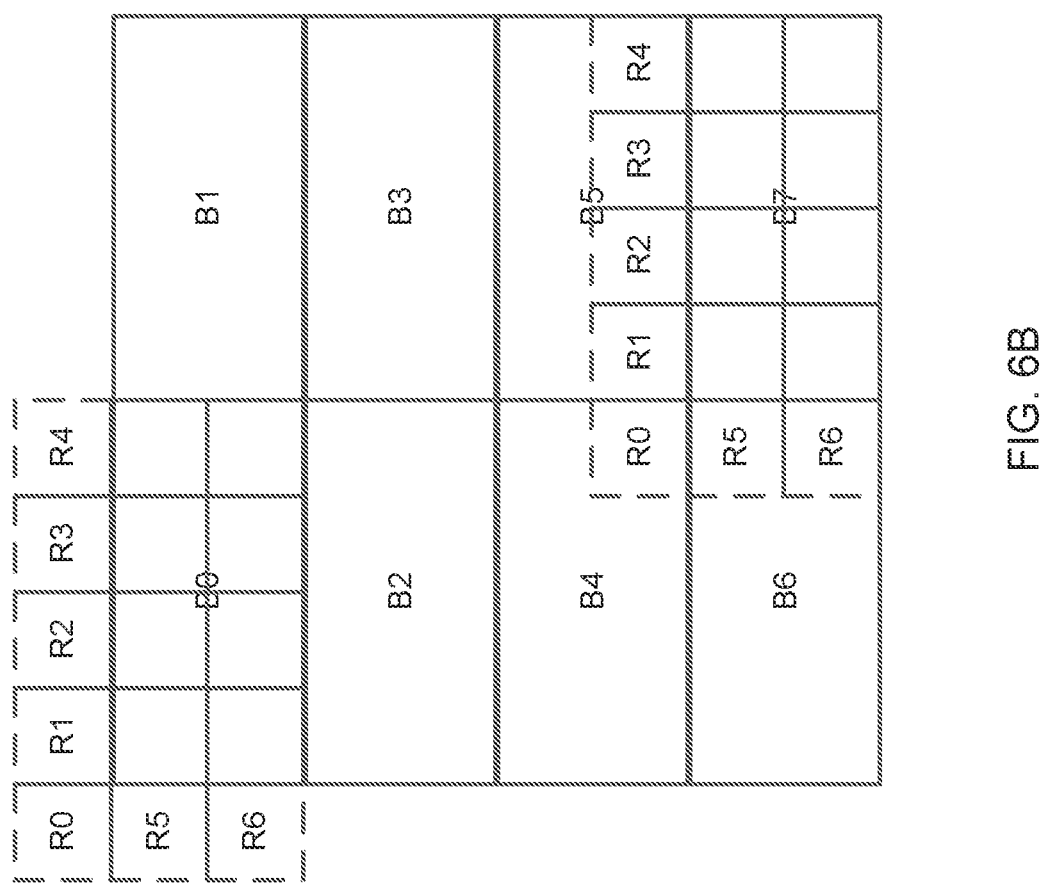

To capture decaying spatial correlation with references on the edges, filter intra modes are designed for luma blocks. Five filter intra modes are defined for AV1, each represented by a set of eight 7-tap filters reflecting a correlation between pixels in a 4×2 patch and 7 neighbors adjacent to it. In other words, the weighting factors for a 7-tap filter are position dependent. Take an 8×8 block for example; it is split into 8 4×2 patches, which is shown in FIG. 6B. These patches are indicated by B0, B1, B2, B3, B4, B5, B6, and B7 in FIG. 6B. For each patch, its 7 neighbors, indicated by R0~R6, are used to predict the pixels in current patch. For patch B0, all the neighbors are already reconstructed. But for other patches, not all the neighbors are reconstructed, then the predicted values of immediate neighbors are used as the references. For example, all the neighbors of patch B7 are not reconstructed, so the prediction samples of neighbors (i.e., B5 and B6) are used instead.

Chroma from Luma (CfL) is a chroma-only intra predictor that models chroma pixels as a linear function of coincident reconstructed luma pixels. The CfL prediction is expressed as follows:

$$CfL(\alpha)=\alpha \times L_{AC}+DC \qquad (1),$$

wherein $L_{AC}$ denotes the AC contribution of luma component, a denotes the parameter of the linear model, and DC denotes the DC contribution of the chroma component. To be specific, the reconstructed luma pixels are subsampled into the chroma resolution, and then the average value is subtracted to form the AC contribution. To approximate chroma AC component from the AC contribution, instead of requiring the decoder to calculate the scaling parameters as in some method, AV1 CfL determines the parameter a based on the original chroma pixels and signals them in the bitstream. This reduces decoder complexity and yields more precise predictions. As for the DC contribution of the chroma component, it is computed using intra DC mode, which is sufficient for most chroma content and has mature fast implementations.

Proposals were made to improve the intra mode coding for the Versatile Video Coding (VVC) standard. For example, two intra prediction mode sets may be defined for each block, which are named as an allowed intra prediction mode set (AIPM, also named as adaptive intra prediction modes) and a disallowed intra prediction mode (DIPM) set. AIPM is defined as one mode set with modes that can be used for intra prediction of a current block, and DIPM is defined as one mode set with modes that cannot be signaled or used for intra prediction of the current block. For each block, the modes in these two mode sets are derived according to the intra prediction modes of neighboring blocks. Neighboring modes are included in the AIPM set but not included in the DIPM set. The number of modes included in the AIPM and DIPM sets are predefined and fixed for all blocks. When the size of the AIPM set is S and the number of derived intra prediction modes from neighboring modes are less than S, the default modes are used to fill the AIPM set.

When applying AIPM to AV1, all the nominal angles are always included in the AIPM despite the block size of a current block and prediction modes of neighboring blocks.

In a decoder-side intra mode derivation (DIMD) process, an intra prediction mode is derived based on previously encoded/decoded pixels, and this is done in the same way at the encoder and decoder sides. Therefore, in the DIMD process, the signaling of an intra prediction mode index is avoided. This process defines a new coding mode called DIMD. One flag is signaled in the bitstream to indicate whether the DIMD mode is selected or not. A decoder-side intra mode derivation may be also called Derived Intra Mode, which has been implemented in proposals under the flag CONFIG_DERIVED_INTRA_MODE.

Two main steps are employed in a DIMD process, which is described in detail as follows.

To implicitly derive an intra prediction mode (IPM) of a DIMD blocks, a texture gradient analysis is performed at both encoder and decoder sides. This process starts with an empty HoG with 65 entries, corresponding to the number of angular modes. Amplitudes of these entries are determined during the texture gradient analysis.

Figure 6C:
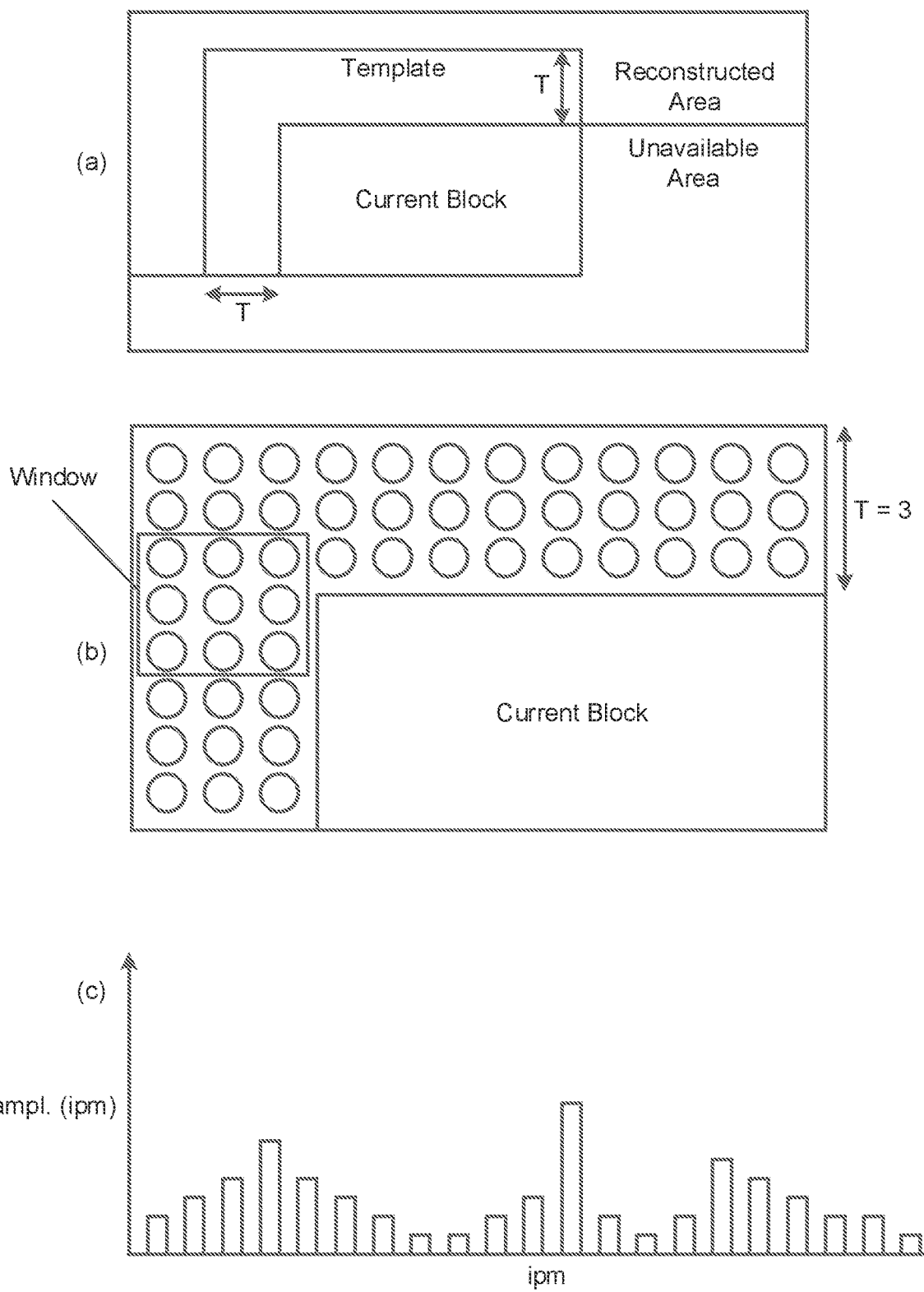
FIG. 6C is a diagram illustrating a template selection from a reconstructed area with T lines of pixels.

In the first step, DIMD picks a template of T=3 columns and rows from respectively left and above a current block, as shown in portion (a) of FIG. 6C. This area will be used as the reference for the gradient-based IPM derivation.

In the second step, the horizontal and vertical Sobel filters are applied on all 3×3 window positions, centered on the pixels of the middle line of the template, as shown in portion (b) of FIG. 6C. On each window position, Sobel filters calculate the intensity of pure horizontal and vertical directions as G_hor and G_ver, respectively. Then, the texture angle of the window is calculated as:

$$angle=\arctan(G_{hor}/G_{hor}) \qquad (2),$$

which can be converted into one of 65 angular IPMs. Once the IPM index of the current window is derived as idx, the amplitude of its entry in the HoG[idx] is updated by the addition of:

$$ampl=|G_{hor}|+|G_{hor}| \qquad (3).$$

Portion (c) of FIG. 6C shows an example of a HoG calculated after applying the above operations on all pixel positions in the template.

If only one single IPM corresponding to the tallest spike of HoG was used, this process is not needed.

Otherwise, if more than one IPM is derived from the DIMD process, this prediction fusion process may be used.

Figure 6D:
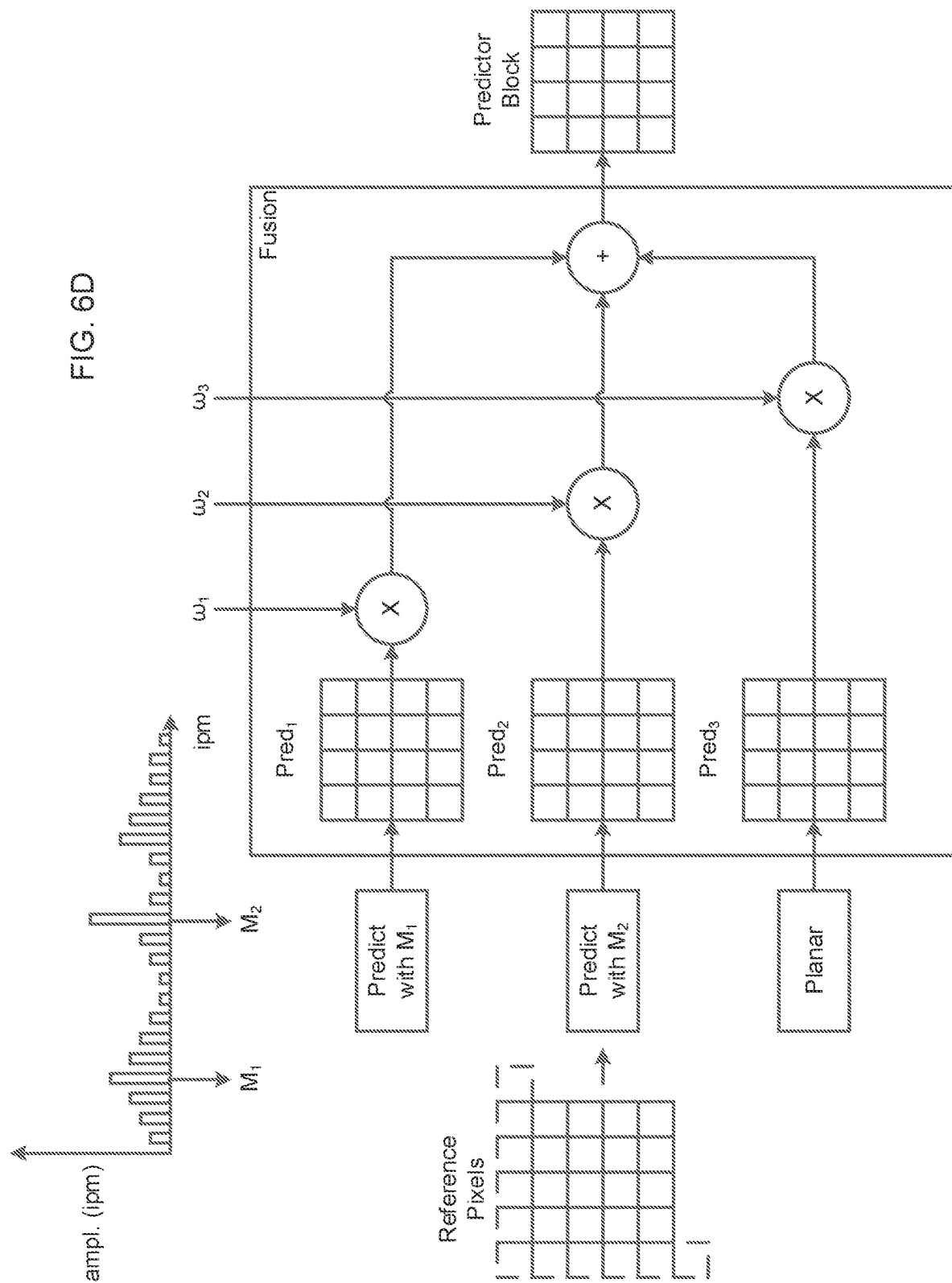
FIG. 6D is a diagram illustrating a prediction fusion by weighted averaging two Histogram of Gradient (HoG) modes and a planar mode.

Prediction fusion is computed by using the weighted average of multiple predictors. FIG. 6D demonstrates one example of a fusion algorithm. As can be seen, two IPMs corresponding to the three tallest spikes of the HoG are detected as M1 and M2. The third IPM is fixed as a planar mode. After applying the pixel prediction by these three IPMs and obtaining Pred1, Pred2 and Pred3, their fusion is computed by a weighted average of the above three predictors. In one example, the weight of the planar mode is fixed to $21/64$ (~$1/3$). The remaining weight of $43/64$ (~$2/3$) is then shared between the two HoG IPMs, proportionally to the amplitude of their HoG bars.

In detail, a first weight $\omega_1$, a second weight $\omega_2$, and a third weight $\omega_3$ may be expressed as follows:

$$\omega_1 = \frac{43}{64} \times \frac{ampl(M_1)}{ampl(M_1) + ampl(M_2)}; \quad (4)$$

$$\omega_2 = \frac{43}{64} \times \frac{ampl(M_2)}{ampl(M_1) + ampl(M_2)}; \text{ and} \quad (5)$$

$$\omega_3 = \frac{21}{64}. \quad (6)$$

Accordingly, a predictor block may be expressed as follows:

$$\Sigma_{i=1}^{3} \omega_i \times Pred_i \quad (7).$$

DIMD uses neighboring samples of a current block to derive one or multiple angular IPMs and assign a shorter codeword for these derived IPMs. AIPM uses the IPMs of neighboring modes to derive a selected IPM list and assign a shorter codeword to the IPMs of neighboring modes. Both methods use the neighboring information to optimize the signaling of IPMs for the current block. However, there is no solution on how to combine these two methods together.

Embodiments of a method and an apparatus for interactions between decoder-side intra mode derivation and adaptive intra prediction modes, are described herein.

In this detailed description, if one mode is not a smooth mode, or is generating prediction samples according to a given prediction direction, this one mode is called an angular mode or a directional mode. DIMD is a general term, and one process is called DIMD if it uses a neighboring reconstructed sample to derive an intra prediction mode.

In embodiments, there are two intra prediction mode sets for each block, which are named an AIPM set and a DIPM set. All non-directional modes are always included in the AIPM set despite a block size of a current block and prediction modes of neighboring blocks.

In an embodiment, all non-directional smooth intra prediction modes in AV1 are always firstly inserted into an AIPM set despite intra prediction modes of neighboring blocks.

In an embodiment, DC, PAETH, SMOOTH, SMOOTH_V, and SMOOTH_H modes are always firstly included in an AIPM set despite intra prediction modes of neighboring blocks.

In an embodiment, modes included in an AIPM set can be split into K levels, K being a positive integer, such as 2 or 3 or 4. For a first level, a number of modes is equal to a number of non-directional modes. For other levels, a number of modes is equal to a power of 2, such as $2^L$, L being a positive integer larger than 1. For example, a number of modes in an AIPM set may be S, and the AIPM set may have 3 levels. S is equal to $K+2^L+2^M$, wherein modes with an index smaller than K in the AIPM set are called first level modes, and modes with an index equal to or larger than K but smaller than $K+2^L$ in the AIPM set are called second level modes, and so on. In an embodiment, all non-directional IPMs are placed in a first level of an AIPM set.

In embodiments, only directional IPMs are included in an AIPM list, and a number of modes in the AIPM is set equal to a power of 2 or a sum of multiples of a power of 2.

In an embodiment, for signaling of intra prediction modes, one flag is signaled to indicate whether a current block is a directional mode or not. If yes, a second flag is signaled to indicate an index of a current mode in an AIPM list. Otherwise, the second flag is signaled to indicate which non-directional mode the current mode is.

In an embodiment, for the signaling of intra prediction modes, one flag is signaled to indicate whether a current block is directional mode or not. If the current block is a directional mode, a second flag is signaled to indicate whether the current mode is a DIMD mode or not. If the current mode is not a DIMD mode, then a third flag is signaled to indicate an index of the current mode in an AIPM list. Otherwise if the current mode is a DIMD mode, then the third flag is avoided, and an IPM of the current block is derived from a decoder side. Otherwise if the current mode is not a directional IPM, then the second flag is signaled to indicate which non-directional mode the current mode is.

In an embodiment, IPMs derived from a DIMD process are always inserted into an AIPM list. In an embodiment, the IPMs derived from the DIMD process are always firstly inserted into the AIPM list and placed in a first level of the AIPM list.

In embodiments, an AIPM scheme is applied to a luma component only, while a DIMD scheme is applied to a chroma component only.

Figure 7:
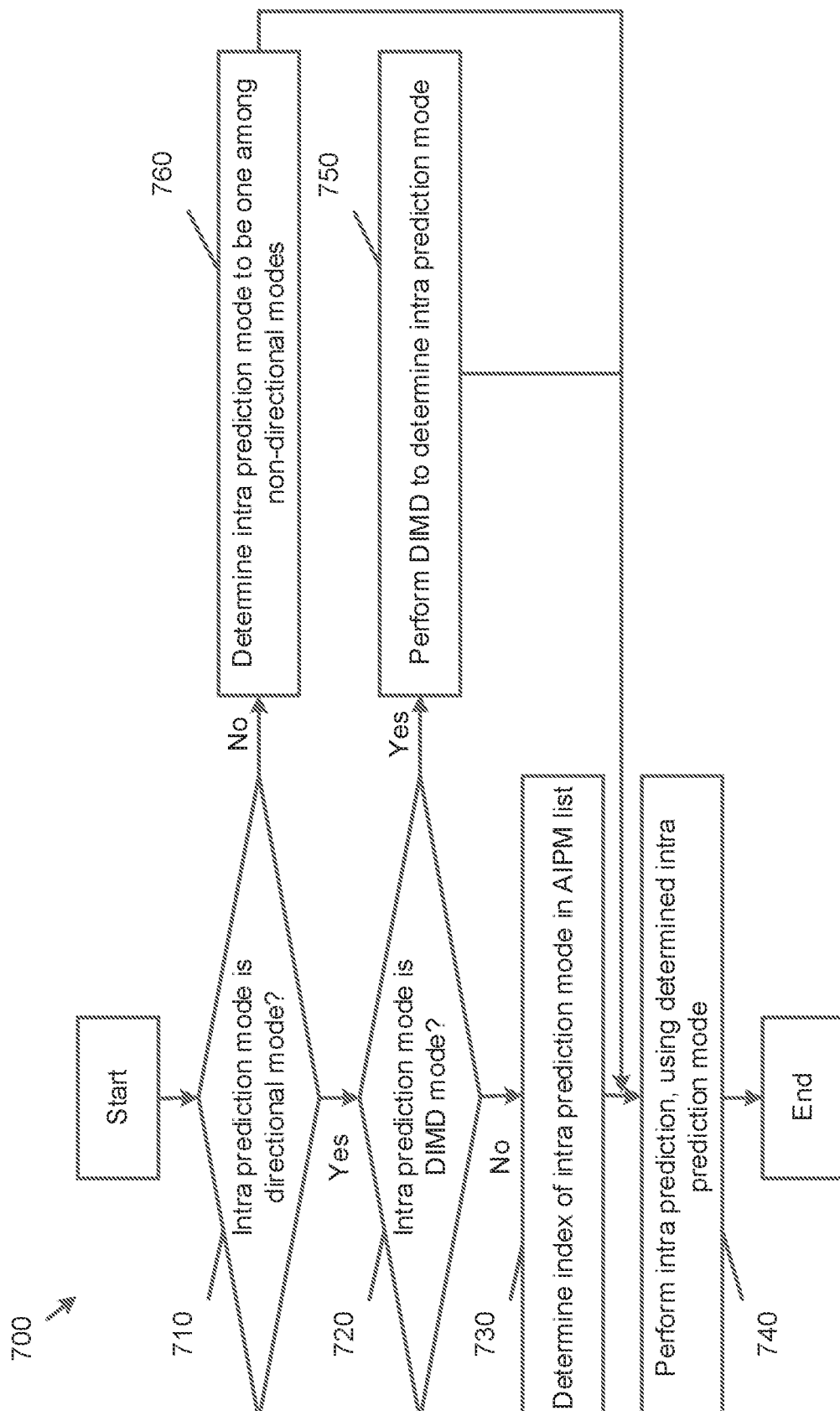
FIG. 7 is a flowchart illustrating a method of performing intra prediction of a current block of a picture of a video sequence, according to embodiments.

FIG. 7 is a flowchart illustrating a method (700) of performing intra prediction of a current block of a picture of a video sequence, according to embodiments. In some implementations, one or more process blocks of FIG. 7 may be performed by the decoder (310). In some implementations, one or more process blocks of FIG. 7 may be performed by another device or a group of devices separate from or including the decoder (310), such as the encoder (303).

Referring to FIG. 7, in a first block (710), the method (700) includes determining whether a first flag indicates that an intra prediction mode corresponding to the current block is a directional mode.

Based on the first flag being determined to indicate that the intra prediction mode corresponding to the current block is the directional mode (710—Yes), in a second block (720), the method (700) includes determining whether a second flag indicates that the intra prediction mode is a decoder-side intra mode derivation (DIMD) mode.

Based on the second flag being determined to not indicate that the intra prediction mode corresponding to the current block is the DIMD mode (720—No), in a third block (730), the method (700) includes determining an index of the intra prediction mode in an allowed intra prediction modes (AIPM) list, and in a fourth block (740), the method (700)

includes performing the intra prediction of the current block, using the intra prediction mode corresponding to the determined index in the AIPM list.

Based on the second flag being determined to indicate that the intra prediction mode corresponding to the current block is the DIMD mode (720—Yes), in a fifth block (750), the method (700) includes performing a DIMD to determine the intra prediction mode, and continues in the fourth block (740), in which the method (700) includes performing the intra prediction of the current block, using the determined intra prediction mode.

Based on the first flag being determined to not indicate that the intra prediction mode corresponding to the current block is the directional mode (710-N), in a sixth block (760), the method (700) includes determining the intra prediction mode to be one among non-directional modes, and continues to the fourth block (740), in which the method (700) includes performing the intra prediction of the current block, using the determined intra prediction mode.

The method (700) may further include inserting the intra prediction mode determined by performing the DIMD, first into a first level of the AIPM list.

The method (700) may further include performing intra prediction of a luma component of the current block, using at least one intra prediction mode in the AIPM list.

The method (700) may further include performing intra prediction of a chroma component of the current block, using the intra prediction mode determined by performing the DIMD.

The AIPM list may include only directional modes, and a number of the directional modes included in the AIPM list may be equal to a power of 2 or a sum of multiples of the power of 2.

Although FIG. 7 shows example blocks of the method (700), in some implementations, the method (700) may include additional blocks, fewer blocks, different blocks, or differently arranged blocks than those depicted in FIG. 7. Additionally, or alternatively, two or more of the blocks of the method (700) may be performed in parallel.

Figure 8:
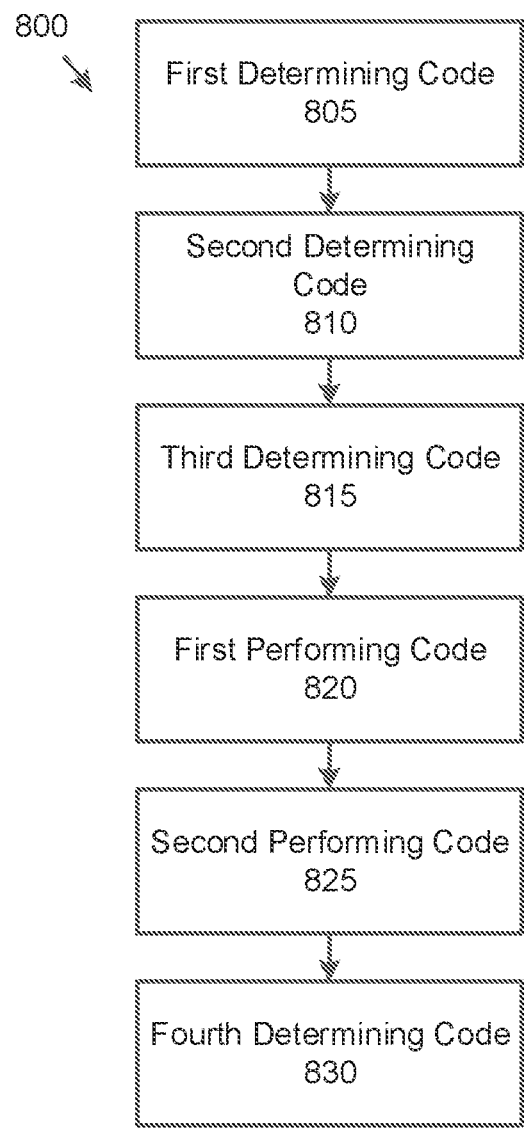
FIG. 8 is a simplified block diagram of an apparatus for performing intra prediction of a current block of a picture of a video sequence, according to embodiments.

FIG. 8 is a simplified block diagram of an apparatus (800) for performing intra prediction of a current block of a picture of a video sequence, according to embodiments.

Referring to FIG. 8, the apparatus (800) includes first determining code (805), second determining code (810), third determining code (815), first performing code (820), second performing code (825) and fourth determining code (830).

The first determining code (805) is configured to cause at least one processor to determine whether a first flag indicates that an intra prediction mode corresponding to the current block is a directional mode.

The third determining code (815) is configured to cause the at least one processor to, based on the first flag being determined to indicate that the intra prediction mode corresponding to the current block is the directional mode, determine whether a second flag indicates that the intra prediction mode is a decoder-side intra mode derivation (DIMD) mode.

The second determining code (810) is configured to cause the at least one processor to, based on the second flag being determined to not indicate that the intra prediction mode corresponding to the current block is the DIMD mode, determine an index of the intra prediction mode in an allowed intra prediction modes (AIPM) list.

The first performing code (820) is configured to cause the at least one processor to, based on the second flag being determined to not indicate that the intra prediction mode corresponding to the current block is the DIMD mode, perform the intra prediction of the current block, using the intra prediction mode corresponding to the determined index in the AIPM list.

The second performing code (825) is configured to cause the at least one processor to, based on the second flag being determined to indicate that the intra prediction mode corresponding to the current block is the DIMD mode, perform a DIMD to determine the intra prediction mode.

The first performing code (820) is further configured to cause the at least one processor to, based on the second flag being determined to indicate that the intra prediction mode corresponding to the current block is the DIMD mode, perform the intra prediction of the current block, using the determined intra prediction mode.

The fourth determining code (830) is configured to cause the at least one processor to, based on the first flag being determined to not indicate that the intra prediction mode corresponding to the current block is the directional mode, determine the intra prediction mode to be one among non-directional modes.

The first performing code (820) is further configured to cause the at least one processor to, based on the first flag being determined to not indicate that the intra prediction mode corresponding to the current block is the directional mode, perform the intra prediction of the current block, using the determined intra prediction mode.

The apparatus (800) may further include inserting code configured to cause the at least one processor to insert the intra prediction mode determined by performing the DWID, first into a first level of the AIPM list.

The apparatus (800) may further include third performing code configured to cause the at least one processor to perform intra prediction of a luma component of the current block, using at least one intra prediction mode in the AIPM list.

The third performing code may be further configured to cause the at least one processor to perform intra prediction of a chroma component of the current block, using the intra prediction mode determined by performing the DIMD.

The AIPM list may include only directional modes, and a number of the directional modes included in the AIPM list may be equal to a power of 2 or a sum of multiples of the power of 2.

FIG. 9 is a diagram of a computer system (900) suitable for implementing embodiments.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are examples in nature and are not intended to suggest any limitation as to the scope of use or functionality of the computer software implementing embodiments. Neither should the configuration of components be interpreted as having any dependency or requirement relating to any one or combination of components illustrated in embodiments of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices), audio output devices (such as: speakers (909), headphones (not depicted)), visual output devices (such as screens (910) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter (950) generates and outputs images to the touch-screen (910).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface(s) to one or more communication networks (955). Networks (955) can for example be wireless, wireline, optical. Networks (955) can further be local, wide-area, metropolitan, vehicular and industrial, real-time, delay-tolerant, and so on. Examples of networks (955) include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks (955) commonly require external network interface adapters that attached to certain general purpose data ports or peripheral buses ((949)) (such as, for example universal serial bus (USB) ports of the computer system (900); others are commonly integrated into the core of the computer system (900) by attachment to a system bus as described below (for example Ethernet interface into a PC computer system or cellular network interface (954) into a smartphone computer system). Using any of these networks (955), computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (955) and network interfaces (954) as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A method of performing intra prediction of a current block of a picture of a video sequence, the method being performed by at least one processor, and the method comprising:
    determining whether a first flag indicates that an intra prediction mode corresponding to the current block is a directional mode;
    based on the first flag being determined to indicate that the intra prediction mode corresponding to the current block is the directional mode, determining whether a second flag indicates that the intra prediction mode is a decoder side intra mode derivation (DIMD) mode; and
    based on the second flag being determined to not indicate that the intra prediction mode is the DIMD mode:
        signaling a third flag indicating an index of the intra prediction mode in an allowed intra prediction modes (AIPM) list; and
        performing the intra prediction of the current block, using the intra prediction mode corresponding to the signaled third flag.

2. The method of claim 1, further comprising:
    based on the second flag being determined to indicate that the intra prediction mode is in the DIMD mode:
        performing a DIMD to determine the intra prediction mode; and
        performing the intra prediction of the current block, using the determined intra prediction mode.

3. The method of claim 1, further comprising inserting the intra prediction mode determined by performing a decoder side intra mode derivation (DIMD), firstly into a first level of the AIPM list.

4. The method of claim 2, further comprising performing intra prediction of a chroma component of the current block, using the intra prediction mode determined by performing the DIMD.

5. The method of claim 1, further comprising, based on the first flag being determined to not indicate that the intra prediction mode corresponding to the current block is the directional mode:
    determining the intra prediction mode to be one among non-directional modes; and
    performing the intra prediction of the current block, using the determined intra prediction mode.

6. The method of claim 1, wherein the performing the intra prediction of the current block, using the intra prediction mode corresponding to the signaled third flag comprises performing intra prediction of a luma component of the current block, using at least one intra prediction mode in the AIPM list.

7. The method of claim 1, wherein the AIPM list comprises only directional modes, and
    a number of the directional modes included in the AIPM list is equal to a power of 2 or a sum of multiples of the power of 2.

8. An apparatus for performing intra prediction of a current block of a picture of a video sequence, the apparatus comprising:
    at least one memory configured to store computer program code; and
    at least one processor configured to access the at least one memory and operate according to the computer program code, the computer program code comprising:
        first determining code configured to cause the at least one processor to determine whether a first flag indicates that an intra prediction mode corresponding to the current block is a directional mode;
        second determining code configured to cause the at least one processor to, based on the first flag being determined to indicate that the intra prediction mode corresponding to the current block is the directional mode, determine whether a second flag indicates that the intra prediction mode is a decoder side intra mode derivation (DIMD) mode; and
        first performing code configured to cause the at least one processor to, based on the second flag being determined to not indicate that the intra prediction mode is the DIMD mode, signal a third flag indicating an index of the intra prediction mode in an allowed intra prediction modes (AIPM) list and perform the intra prediction of the current block, using the intra prediction mode corresponding to the signaled third flag.

9. The apparatus of claim 8, wherein the computer program code further comprises:
    second performing code configured to cause the at least one processor to, based on the second flag being determined to indicate that the intra prediction mode is in the DIMD mode, perform a DIMD to determine the intra prediction mode,
    wherein the first performing code is further configured to cause the at least one processor to, based on the second flag being determined to indicate that the intra prediction mode is in the DIMD mode, perform the intra prediction of the current block, using the determined intra prediction mode.

10. The apparatus of claim 8, wherein the computer program code further comprises inserting code configured to cause the at least one processor to insert the intra prediction mode determined by performing a decoder side intra mode derivation (DIMD), firstly into a first level of the AIPM list.

11. The apparatus of claim 9, wherein the second performing code is further configured to cause the at least one processor to perform the intra prediction of a chroma component of the current block, using the intra prediction mode determined by performing the DIMD.

12. The apparatus of claim 8, wherein the computer program code further comprises third determining code configured to cause the at least one processor to, based on the first flag being determined to not indicate that the intra prediction mode corresponding to the current block is the directional mode, determine the intra prediction mode to be one among non-directional modes, and wherein the first performing code is further configured to cause the at least one processor to, based on the first flag being determined to not indicate that the intra prediction mode corresponding to the current block is the directional mode, perform the intra prediction of the current block, using the determined intra prediction mode.

13. The apparatus of claim 8, wherein the first performing code is further configured to cause the at least one processor to perform intra prediction of a luma component of the current block, using at least one intra prediction mode in the AIPM list.

14. The apparatus of claim 8, wherein the AIPM list comprises only directional modes, and
a number of the directional modes included in the AIPM list is equal to a power of 2 or a sum of multiples of the power of 2.

15. A non-transitory computer-readable storage medium storing instructions that cause at least one processor to:
determine whether a first flag indicates that an intra prediction mode corresponding to a current block is a directional mode; and
based on the first flag being determined to indicate that the intra prediction mode corresponding to the current block is the directional mode, determining whether a second flag indicates that the intra prediction mode is a decoder side intra mode derivation (DIMD) mode; and
based on the second flag being determined to not indicate that the intra prediction mode is the DIMD mode:
signaling a third flag indicating an index of the intra prediction mode in an allowed intra prediction modes (AIPM) list; and
performing the intra prediction of the current block, using the intra prediction mode corresponding to the signaled third flag.

16. The non-transitory computer-readable storage medium of claim 15, wherein the instructions further cause the at least one processor to:
based on the second flag being determined to indicate that the intra prediction mode is in the DIMD mode:
perform a DIMD to determine the intra prediction mode; and
perform the intra prediction of the current block, using the determined intra prediction mode.

17. The non-transitory computer-readable storage medium of claim 15, wherein the instructions further cause the at least one processor to insert the intra prediction mode determined by performing a decoder side intra mode derivation (DIMD), firstly into a first level of the AIPM list.

18. The non-transitory computer-readable storage medium of claim 16, wherein the instructions further cause the at least one processor to perform intra prediction of a chroma component of the current block, using the intra prediction mode determined by performing the DIMD.

19. The non-transitory computer-readable storage medium of claim 15, wherein the instructions further cause the at least one processor to, based on the first flag being determined to not indicate that the intra prediction mode corresponding to the current block is the directional mode:
determine the intra prediction mode to be one among non-directional modes; and
perform the intra prediction of the current block, using the determined intra prediction mode.

20. The non-transitory computer-readable storage medium of claim 15, wherein the instructions further cause the at least one processor to perform intra prediction of a luma component of the current block, using at least one intra prediction mode in the AIPM list.

* * * * *